Sept. 4, 1934.  P. J. KIELY  1,972,386
SHOE SOLE GROOVING MACHINE
Filed Jan. 14, 1933  2 Sheets-Sheet 1
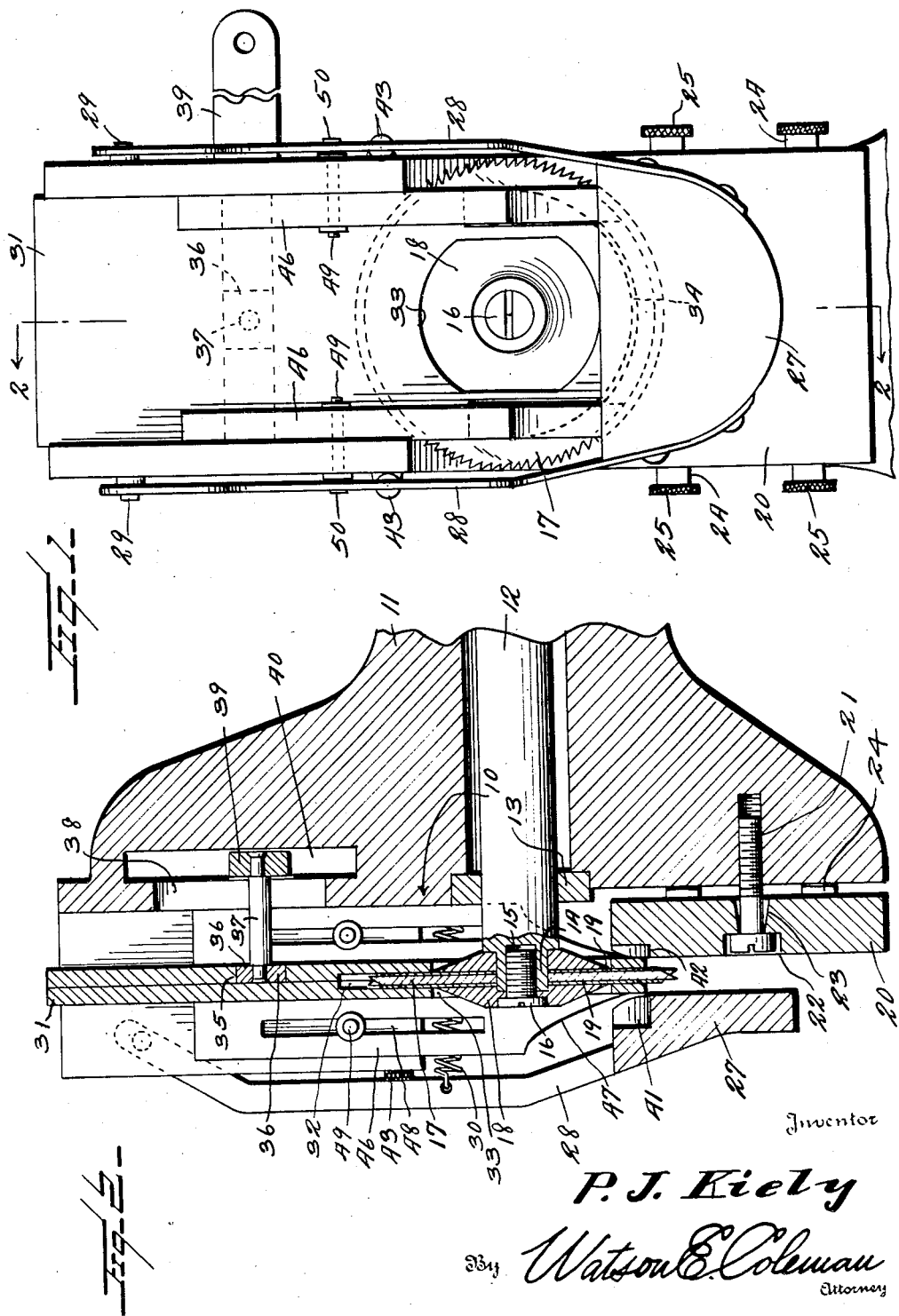
Inventor
P. J. Kiely
By Watson E. Coleman
Attorney Sept. 4, 1934.   P. J. KIELY   1,972,386
SHOE SOLE GROOVING MACHINE
Filed Jan. 14, 1933   2 Sheets-Sheet 2
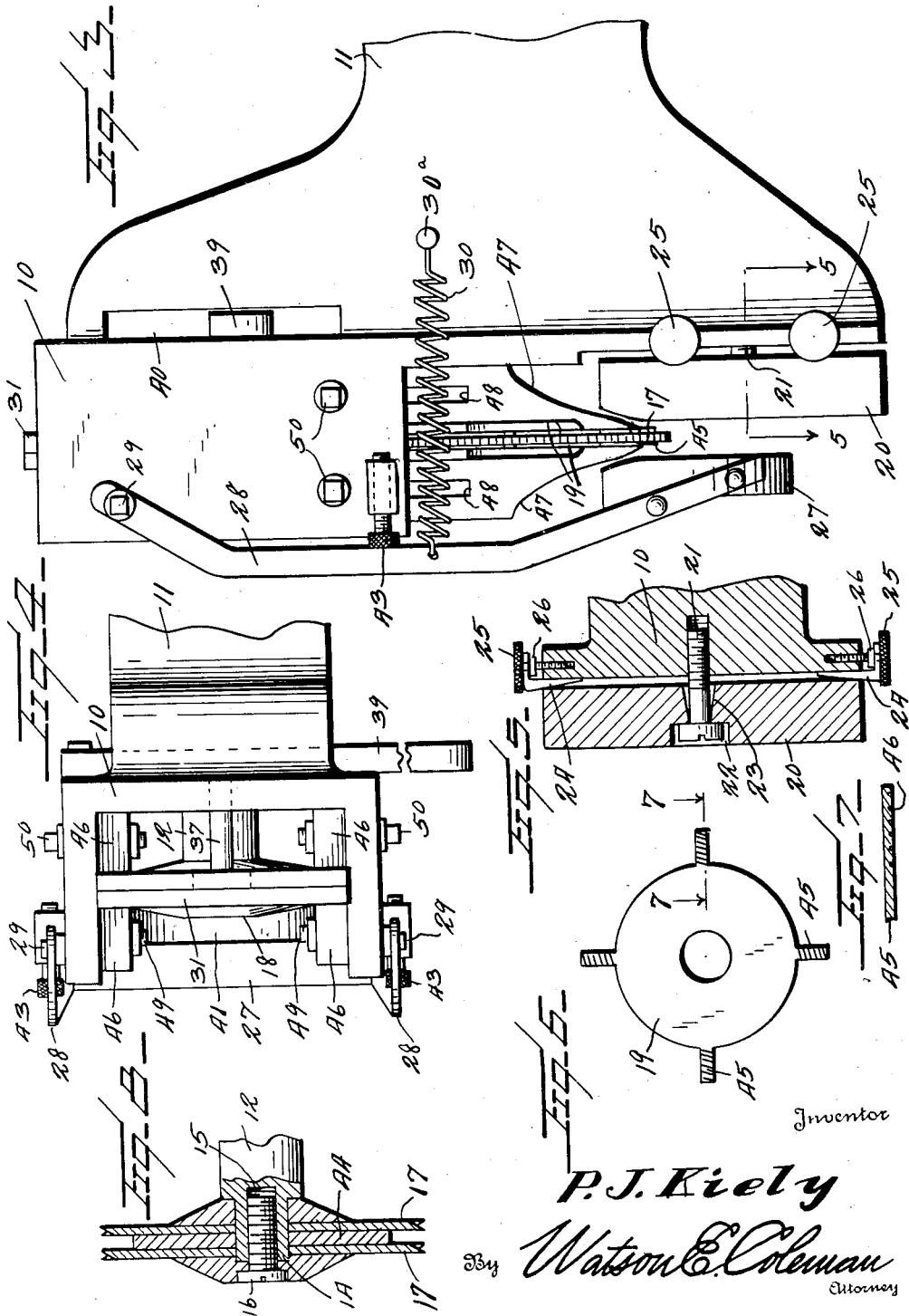

Patented Sept. 4, 1934

1,972,386

UNITED STATES PATENT OFFICE 1,972,386

SHOE SOLE GROOVING MACHINE

Patrick Joseph Kiely, Carlisle, Pa.

Application January 14, 1933, Serial No. 651,814

13 Claims. (Cl. 12—27)

This invention relates to shoe machinery and particularly to a mechanism designed for the purpose of grooving the edge of material such as shoe soles.

The particular object of the invention is to provide a means whereby the edge of a shoe sole may be grooved to any desired depth to thus permit the application of an upper thereto in the manner shown in my co-pending application filed of even date herewith, which has matured as Patent No. 1,959,792, granted May 22, 1934.

Heretofore in the manufacture of shoes, in order to provide for the attachment of the upper to the shoe sole, it has been common practice to slit the edge of the shoe sole by forcing the edge of the shoe sole against a stationary knife. This knife makes a slit in the shoe sole extending parallel to the upper and lower surfaces thereof, this slit being in the form of a very acute V.

My present invention contemplates the provision of a saw for sawing out the material in the form of a kerf or groove from the edge of the sole, thus cutting away from the sole material equal in thickness to the folded edge of an upper or in other words equal to two thicknesses of the upper so that the folded edge of the upper may be inserted within this groove and fill this space so cut out and abut firmly against a shoulder or wall formed at the inner end of this groove, which is impossible where a slit is cut in the shoe sole.

A further object secured by the use of a saw as distinguished from a knife, either a fixed knife or a rotatable knife, is that the saw teeth roughen the inner surfaces of the groove so cut so that cement such as pyroxylin commonly used in making shoes may be applied to these roughened surfaces to hold the upper in place within the groove.

A still further object of the present invention is to provide means which will prevent the smooth faces of the saw from coming in contact with the walls of the slit and prevent the burning of the faces of the opposite walls of the slit which very greatly weakens the leather and in this connection to prevent the roughened surfaces formed by the saw from being smoothed.

Still another object of the invention is to provide in connection with such a saw, gage means whereby the depth of cut may be adjusted and another object is to provide a saw mandrel upon which one or more saws may be disposed in close conjunction with each other so as to cut grooves of different widths.

A further object is to provide improved means for holding the work in place for sawing and provide means whereby the kerf may be cut either close to the inside margin of the sole at the middle thickness of the sole or closer to the outside face of the sole.

Other objects will appear in the course of the following description.

My invention is illustrated in the accompanying drawings, wherein:—

Figure 1 is a front elevation of a sole grooving machine constructed in accordance with my invention;

Figure 2 is a section on the line 2—2 of Figure 1;

Figure 3 is a fragmentary side elevation of the structures shown in Figures 1 and 2;

Figure 4 is a fragmentary plan view;

Figure 5 is a section on the line 5—5 of Figure 3;

Figure 6 is a face view of one of the anti-friction disks;

Figure 7 is a fragmentary section on the line 7—7 of Figure 6;

Figure 8 is a sectional view through the mandrel of the saw showing the shoe of two spaced blades.

Referring to these drawings, 10 designates a head mounted upon a supporting arm, the adjacent portion of which is designated 11. This arm may be supported in any suitable manner and its particular construction forms no part of my invention;

It will be seen that this head 10 as shown in Figure 4 is rectangular in cross section having a rear wall and two end walls. Extending through the arm 11 and into the hollow interior of the head is a saw mandrel 12 shown as supported at its outer end in a bearing bushing 13, it being understood that this mandrel might be supported in any suitable manner. Any suitable means may be used for rotating this mandrel. The forward end of the mandrel is reduced in diameter at 14 and has an interiorly screw-threaded countersink 15 carrying the holding screw 16. Adapted to be disposed upon this mandrel and particularly upon the reduced portion 14 thereof is the saw 17.

The edge face of the saw 17 is toothed, these teeth being of any suitable character and it is obvious that these teeth might be of various characters upon different saws so as to secure different results.

Disposed on each side of the saw and holding it in place are the clamping disks 18 which are beveled on their margins. Disposed between the clamping disks and the saw are the anti-friction plates or disks, one of which is illustrated in Figure 6 and which will be later described, these anti-friction disks being designated 19.

Opposed to the lower vertical face of the head 11 is an adjustable abutment 20 in the form of a plate, this being held in place upon the lower portion of the head 10 by means of the screw 21. The plate 20 as shown in Figures 2 and 5 is formed with the counter-sink 22 for the head of the screw 21 and rearward of this countersink with a rearwardly flared passage 23 through which the screw passes. The abutment 20 is, therefore, loosely held upon the lower face of the head. The abutment is capable of being adjusted toward or from the face of the head by the use of the wedges 24. Four of these wedges are shown, two on each side, each wedge 24 being inserted in the space between the face of the head 10 and the rear face of the abutment 20 and these wedges are adjustable inward to force the abutment outward by means of the adjusting screws 25. As illustrated, these wedges are angularly extended at their outer ends and the adjusting screws 25 pass through these angular ends of the wedges. A collar 26 is disposed on each screw 25 to bear against the inner face of the angular portion of the wedge so that the wedges are positively moved inward or outward as the screws are turned.

The screws, of course, are provided with knurled heads whereby they may be adjusted. In adjusting these wedges, the screw 21 is first loosened and then the wedges adjusted to the proper degree and then the screw 21 is again tightened to force the abutment 20 against the wedges. By forcing the upper pair of wedges in further than the lower pair of wedges or the lower pair in further than the upper pair or otherwise differentially adjusting these screws or wedges, it is obvious that the abutment plate 20 may be adjusted at an angle with reference to the saw instead of parallel to the saw. The work is disposed against this abutment plate 20 and forced against the saw and obviously, therefore, if the abutment plate is disposed at an angle to the saw, the kerf cut by the saw will be disposed at an angle.

Opposed to the abutment plate 20 is a presser foot or work holder 27. This is in the form of an approximately semi-circular plate as shown in Figure 1 which is supported by two arms 28 which extend upward on each side of the head and at their upper ends are pivoted to the head by pivots 29. These arms are preferably outwardly bowed as shown in Figure 2 and the arms and the plate 27 are urged inward by means of the springs 30 attached to the arms and to pins 31 projecting from the supporting arm 11. While I have illustrated the presser or work holding plate 27 as being rigid with the arms, it is to be understood that it might be pivoted to the arms so that in all positions of the plate 27, it would be parallel to the face of the abutment plate 20.

For the purpose of limiting the depth of the groove or kerf cut by the saw in the sole or other element being acted on, I provide a gage formed of two conjoined plates as shown in Figure 2, this gage being generally designated 31. The two plates of the gage are cut away at their inside faces as at 32 to accommodate the saw and are centrally cut out as at 33 to accommodate the saw clamps 18 and to permit the screw 16 to be removed for changing saws. These plates which constitute the depth gage are convexly curved at their lower edges at 34 concentrically to the saw. The depth gage 31 is adjustable vertically and to this end, one of the plates 31 is formed with a transversely extending slot 35 within which is disposed a square head 36 swivelly mounted upon a pin 37. This pin extends rearwardly through the rear wall of the head 10 which is slotted at 38 for this purpose and engages with a lever 39 operating in a vertical slot 40 formed in the head or in the enlarged portion of the arm 11 immediately rearward of the head. This lever is intended to be manually shiftable vertically. Means are provided for holding this lever in its adjusted positions and finely adjusting it.

It will be seen from Figure 2 that the confronting faces of the abutment plate 20 and of the presser plate 27 at the upper ends of these plates are cut away respectively at 41 and 42 to accommodate the two portions of the gage 31 which extend down on each side on each face of the saw. Not only may the abutment plate 20 be adjusted inward or outward toward or from the saw, but stop screws, the heads of which are designated 43, are used for limiting the inward movement of the arms 28, these screws being adjustable so that the inner face of the presser plate when the presser plate is forced fully inward may be brought accurately to a predetermined distance from the face of the abutment plate 20. Obviously if the plate 20 be adjusted outward, the plate 27 also being adjusted outward, the groove will be nearer that face of the sole contacting with the abutment 20 than it will that face of the sole contacting with the face 27.

On the other hand, if the abutment plate 20 be adjusted away from the saw and the stop screws 43 be adjusted to permit the plate 27 to move inward further, the groove or kerf will be cut adjacent the face of the sole, that is, the face contacting with the presser plate 27. The width of the groove cut in the sole or other element depends, of course, upon the width of the saw used and with my machine, it is possible to use a plurality of saw blades disposed one against the other for cutting a relatively wide kerf or groove and, as shown in Figure 8, it is possible to use two saws 17 spaced from each other by means of an intermediate washer 44 or a plurality of thin intermediate washers or shims may be used for separating the saws just the amount desired and, under these circumstances, of course, two kerfs will be cut in the sole or other element being acted on. By using a thick and a thin saw, one of these kerfs may be relatively wide and the other relatively narrow.

If the saw 17 contacted directly with the side walls of the cut made by the saw, while the teeth of the saw would roughen up the faces of the side walls, the smooth portion of the saw beyond the teeth would tend to burn these roughened faces and to smooth them to a certain extent. In order to preserve these roughened faces, therefore, which is particularly necessary when the cut is deeper than the depth of the teeth on the saw, I provide the disks 19 previously referred to, which disks are disposed one on each side of the saw blade as shown in Figure 2 and are provided with the radially extending arms 45, these arms being very slightly notched or slitted at 46 (see Figure 7,) these slits or notches extending diagonally of the width of the arms 45.

It will be understood that these disks 19 and the arms 45 are made of very thin metal. For instance, they may each have a thickness of one-thirty-second of an inch and in that case the kerfs 46 will be approximately one-sixty-fourth of an inch in depth. These thin arms 45 act to spread the wall on each side of the cut away from the surface of the saw blade and the kerfs on these thin arms act to roughen up or keep the surface roughened up while the saw is cutting into the leather. Under some circumstances, it is desirable that a very deep cut be made as, for instance, where it is desired to split a sole entirely across or make a very deep flap. In this case, the depth gages 31 are removed entirely from the machine and in order to prevent the contact of the roughened surface of the leather so cut with the smooth surface of the saw, which, as above stated, would tend to burn the inner faces of the cut or smooth them, I provide the deflectors illustrated as four in number and designated 46. These deflectors extend vertically on each side of the saw and at their lower ends are beveled downward and inward and bear against the lateral portions of the saw blade so that as the leather is split or cut or deeply kerfed, these inclined or rounded edges 47 will force the two walls of the cut outward, and away from the saw blade. By reason of the slots 48, formed in these deflectors 46, the deflectors may be held in any adjusted position by means of the bolts 49 which have heads or washers on the inside ends bearing against the margins of the slots 48 and at their outside ends carry nuts and washers 50. Normally and when cuts or kerfs of relatively small depth are to be cut, the depth gages 31 are used and the elements 46 are shifted out of position and these members 46 are only used when cutting flaps or splitting a sole.

It is to be understood that the members 46 may be also used when the depth gage is used. If a sole is simply pushed upward, against the saw, the inner faces of the groove made by the saw would be prevented from coming in contact with the saw itself by the disks 19 with the arms 45, but where the sole or other piece of work is being forced longitudinally along the edge of the saw so as to cut a groove, for instance, along the entire peripheral edge of the sole, the wedge-shaped lower ends 47 of the members 46 act to hold the walls of the cut apart and keep the leather away from the teeth of the cutter as the work is advanced.

It will be seen that by the aid of this machine, slots of uniform width and of proper depth may be cut in the edges of shoe soles instead of cutting "channels" in these shoe soles by means of knives and that either one or a plurality of grooves may be cut in the shoe soles by this machine and these grooves may be both of the same width or both of different widths and both of the same depth or of different depths by using saws of different diameters. These grooves may be cut nearer to or further from one face of the sole by properly adjusting the abutment plate 20 and the presser plate 27 and may be cut to any desired depth accurately by properly adjusting the depth gage 31. The rough surface of the leather on each side of the cut is prevented from coming in contact with the smooth face of the saw so that it is not burned or smoothed and where deep cuts are made, the leather is forced away from contact with the smooth face of the saw.

While I have designed my device for particular use with shoe soles for cutting grooves therein, I do not wish to be limited to this, as obviously it might be used for other purposes.

In my construction, a passageway or channel is left between the abutment plate 20 and the presser plate or work holder 27, this channel being entirely open at its ends and entirely open and unobstructed radially downward from the center of the saw. Thus the work may be shifted longitudinally and vertically, that is, in a direction at right angles to the length of the head 11 or parallel to the length of the head. This permits a shoe sole to be inserted between the abutment plate and the presser plate 27 and the shoe sole fed through the machine so as to carry the saw around any portion of the shoe sole or around the entire perimeter of the shoe sole if desired, the kerf following the edge contour of the shoe sole.

I claim:—

1. A shoe sole grooving machine including a support, a saw mandrel carried thereby and projecting beyond the end face of the support, a single circular saw carried by the mandrel and disposed parallel to the end face of the support, an abutment plate disposed beyond the periphery of the saw but overlapping said periphery and against the face of which the work is disposed in order to be guided toward the edge of the saw, the abutment plate including a screw passing loosely through the middle of the abutment plate and into said support, and adjustable means engaging opposite ends of the abutment plate on opposite sides of the screw for shifting either end of the abutment plate outward toward the plane of the saw, the space around said saw for receiving the work being free and unobstructed to permit the free movement of the work disposed against said abutment plate in a plane parallel to the saw and either transversely to the axis of the saw or toward or from the mandrel.

2. A shoe sole grooving machine including a support, a saw mandrel carried thereby, a circular saw carried by the mandrel, an abutment plate disposed beyond the periphery of the saw and against the face of which the work is disposed in order to be guided toward the edge of the saw, and means for supporting and adjusting the abutment plate including a screw passing loosely through the abutment plate and into said support, the passage of the screw permitting the plate to be rocked in any direction, and wedges disposed between the abutment plate and the support and adjustable inward or outward to thereby shift the abutment plate toward or from the support and hold it in shifted position.

3. A shoe sole grooving machine including a support, a saw mandrel carried thereby, a circular saw carried by the mandrel, an abutment plate disposed beyond the periphery of the saw and against the face of which the work is disposed in order to be guided toward the edge of the saw, and means for supporting and adjusting the abutment plate including a screw passing loosely through the abutment plate and into said support, the passage for the screw permitting the abutment plate to be rocked in any direction, and wedges disposed between the four corners of the abutment plate and the support and adjustable inward or outward to thereby shift the abutment plate toward or from the support and hold it in shifted position, the wedges being independently adjustable whereby the abutment plate may be disposed at an angle to the plane of the saw.

4. A shoe sole grooving machine including a support, a single saw mandrel carried thereby, a saw carried by the mandrel, an abutment plate disposed inward of the inner face of the saw and extending beyond the periphery of the saw and against the face of which the work is disposed to be guided toward the edge of the saw, the plate being adjustable toward or from the plane of the saw, and a work holder plate opposed to the abutment plate and urged toward the abutment plate, the passage between the abutment plate and the work holding plate being open at its opposite ends and at the side opposite the saw.

5. A shoe sole grooving machine including a support, a saw mandrel carried thereby, a saw carried by the mandrel, an abutment plate disposed beyond the periphery of the saw and against the face of which the work is disposed to be guided toward the edge of the saw, the plate being adjustable toward or from the plane of the saw, a work holder opposed to the abutment plate, arms supporting the work holder and extending upward above the saw and pivotally engaged with the support, springs urging the arms inward toward the abutment plate, and adjustable stops limiting the inward movement of said arms.

6. A shoe sole grooving machine including a support, a single saw mandrel carried thereby projecting beyond the end face of the support, means for supporting one or more saws upon the saw mandrel with the saw or saws in parallel relation to the face of the support, an abutment plate carried by the end face of the support and disposed inward beyond the inner face of the saw or saws and against the face of which the work is disposed to be guided toward the edge of the saw, said abutment plate being adjustable toward or from the plane of the saw, and a work holding plate opposed to the abutment plate, resiliently urged toward the latter, the space around said saw for receiving the work being free and unobstructed to permit free movement of the work disposed against said abutment plate in a plane parallel to the saw and in a plurality of directions radial to the axis of the saw.

7. A shoe sole grooving machine embodying a support, a saw mandrel carried thereby, a circular saw carried by the mandrel, an abutment plate disposed to extend over the periphery of the saw and disposed in a plane inward of the plane of the inner face of the saw and against the face of which abutment plate the work is disposed to be guided toward the edge of the saw, and a gage adjustable to limit the depth of cut made by said saw and having portions disposed on opposite faces of the saw.

8. A shoe sole grooving machine embodying a support, a saw mandrel carried thereby, a circular saw carried by the mandrel, an abutment plate disposed beyond the periphery of the saw and against the face of which the work is disposed to be guided toward the edge of the saw, and a gage adjustable to limit the depth of cut made by said saw, the gage being formed in two sections disposed on opposite faces of the saw, the sections being spaced from each other to accommodate the saw, the gage being adjustable to regulate the depth of cut.

9. In a machine of the character described, a saw mandrel, a circular saw thereon, and means for preventing contact of the material being cut with the side faces of the saw comprising disks disposed on opposite faces of the saw, the outer margins of the disks being formed with grooves extending at an angle to the direction of rotation of the disks.

10. In a machine of the character described, a saw mandrel, a circular saw thereon, and means for preventing contact of the material being cut with the side faces of the saw comprising disks disposed on opposite faces of the saw and rotating therewith, the disks having arms extending radially therefrom to the toothed edge of the saw, the arms being transversely grooved.

11. In a machine of the character described, a support, a saw mandrel carried thereby, a circular saw carried by the mandrel, an abutment plate disposed beyond the periphery of the saw and against the face of which the work is disposed to be guided toward the edge of the saw, and means for preventing contact of the inner faces of the material formed of the opposite walls of the groove cut by the saw comprising adjustable members disposed on each face of the saw and having their lower ends beveled downwardly and inwardly toward the plane of the saw.

12. A shoe sole grooving machine embodying a head, a single saw mandrel extending through the head, a saw carried by the mandrel in spaced relation to the face of the head, an abutment plate carried by the head and having a margin overlapping the periphery of the saw, the inner face of the abutment plate being disposed inward of the inner face of the saw, a work holding plate opposed to the abutment plate and having a width equal to the abutment plate, the inner face of the work holding plate overlapping the periphery of the saw but being disposed outward of the outer face of the saw, means urging the work holding plate toward the abutment plate, and a stop limiting the inward movement of the work holding plate.

13. A shoe sole grooving machine including a support, a saw mandrel carried thereby, the support extending downward beyond the periphery of the saw, an abutment plate disposed opposite the downwardly extending portion of the support and beyond the periphery of the saw and against the face of which the work is disposed to be guided toward the edge of the saw, the space around the saw for receiving the work being free and unobstructed to permit free movement of the work disposed against said abutment plate toward or from the mandrel or in a plane substantially parallel to the saw and extending transversely of the axis thereof, the abutment plate having a counter-sink in its outer face at its middle and an outwardly flaring passage leading from the counter-sink, a screw having its head disposed in the counter-sink and extending through the passage and into the support, and adjustable means between the face of the support and the inner face of the abutment plate and disposed above and below the medial bolt whereby the abutment plate may be shifted bodily outward into any one of a plurality of planes parallel to the plane of the saw or be permitted to move inward.

P. JOSEPH KIELY.